(12) United States Patent
Hironaka et al.

(10) Patent No.: US 12,360,712 B2
(45) Date of Patent: Jul. 15, 2025

(54) IMAGE PROCESSING SYSTEM FOR SPECIFYING COUNTERMEASURES AGAINST ERRORS, IMAGE FORMING SYSTEM, INFORMATION PROCESSING APPARATUS, INSPECTION METHOD, COUNTERMEASURE SPECIFYING PROGRAM, COUNTERMEASURE SPECIFYING SYSTEM, LEARNING APPARATUS, AND LEARNING METHOD

(71) Applicant: Konica Minolta, Inc., Tokyo (JP)

(72) Inventors: Motoki Hironaka, Musashino (JP); Yutaka Miyasaka, Machida (JP); Takenobu Kimura, Hachioji (JP); Kei Okamura, Yokohama (JP); Kei Yuasa, Sagamihara (JP); Tomohiro Mikami, Mitaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/507,226

(22) Filed: Nov. 13, 2023

(65) Prior Publication Data

US 2024/0176556 A1 May 30, 2024

(30) Foreign Application Priority Data

Nov. 24, 2022 (JP) ................................ 2022-187158

(51) Int. Cl.
*G06F 3/12* (2006.01)
*G06T 7/00* (2017.01)
*H04N 1/00* (2006.01)

(52) U.S. Cl.
CPC ............ *G06F 3/121* (2013.01); *G06F 3/1234* (2013.01); *G06F 3/1285* (2013.01); *G06T 7/001* (2013.01); *H04N 1/00013* (2013.01); *H04N 1/00037* (2013.01); *G06T 2207/10016* (2013.01); *G06T 2207/20081* (2013.01); *G06T 2207/30144* (2013.01)

(58) Field of Classification Search
None
See application file for complete search history.

(56) References Cited

U.S. PATENT DOCUMENTS

| 2012/0013935 A1* | 1/2012 | Adachi | .................. B41J 2/2135 358/1.14 |
| 2020/0257586 A1* | 8/2020 | Kobayashi | .......... G06F 11/0721 |
| 2021/0075920 A1* | 3/2021 | Ogura | ................ H04N 1/32694 |

FOREIGN PATENT DOCUMENTS

| JP | 2008211662 A | * | 9/2008 |
| JP | 2021-51133 A | | 4/2021 |

(Continued)

OTHER PUBLICATIONS

English translation of JP-2008211662-A. (Year: 2008).*
Extended European Search Report (EESR) dated Apr. 2, 2024 for European Patent Application No. 23210823.3.

*Primary Examiner* — Thomas D Lee
(74) *Attorney, Agent, or Firm* — RANKIN, HILL & CLARK LLP

(57) ABSTRACT

An image processing system includes: an image reader that reads an image formed on a recording medium; an inspector that performs an inspection of an error of the image read by the image reader; and a specifier that specifies a countermeasure on a basis of information related to a result of the inspection by the inspector and a predetermined proposal condition.

17 Claims, 13 Drawing Sheets

(56) References Cited

FOREIGN PATENT DOCUMENTS

| JP | 7081376 B2 | 6/2022 |
|---|---|---|
| JP | 2022-127128 A | 8/2022 |

\* cited by examiner

FIG. 5A

| CLASSIFICATION | FEATURE OF IMAGE |
|---|---|
| FD STREAK/ CD STREAK | INTERVAL OF FD STREAK |
| | WIDTH OF STREAK |
| | SHARPNESS OF STREAK |
| | DENSITY DIFFERENCE OF STREAK |
| | OCCURRENCE POSITION |
| | COMMON STREAK |
| | GLOSS DIFFERENCE |
| DIRT | SIZE |
| | NUMBER (FREQUENCY) |
| | OCCURRENCE POSITION (DISTRIBUTION) |
| | SHAPE |
| | COLOR (SINGLE COLOR or MIXED COLOR) |
| WHITE SPOT | SIZE |
| | NUMBER (FREQUENCY) |
| | OCCURRENCE POSITION (DISTRIBUTION) |
| | SHAPE |

FIG. 5B

| CLASSIFICATION | FEATURE OF MACHINE |
|---|---|
| DIRT | PRIMARY TRANSFER OUTPUT |
| | SECONDARY TRANSFER OUTPUT |
| FD STREAK | FIXING AIR VOLUME |
| | FIXING UPPER TEMPERATURE |
| | FIXING LOWER TEMPERATURE |
| | FIXING NIP PRESSURE |
| | PFU SUCTION AIR VOLUME |
| | DENSITY BALANCE ADJUSTMENT VALUE |
| CD STREAK | SCREEN |
| | AC BIAS FINE ADJUSTMENT VALUE |
| UNEVENNESS | DEVELOPMENT OUTPUT ADJUSTMENT VALUE |
| | FOG MARGIN FINE ADJUSTMENT VALUE |
| | TONER DENSITY FINE ADJUSTMENT VALUE |
| | TONER CHARGING AMOUNT |
| | BULK DETECTION |
| | GAMMA OFFSET ADJUSTMENT VALUE |
| | RIP FORMAT |
| | DEVELOPMENT AC FREQUENCY FINE ADJUSTMENT |
| | PRIMARY TRANSFER STATIC ELIMINATING ELECTRODE OUTPUT |
| ENTIRETY | FEED SPEED SETTING |
| | LINEAR VELOCITY |
| | COVERAGE |
| | ENVIRONMENT (TEMPERATURE OR HUMIDITY) |
| | SPEED OF EACH MEMBER |

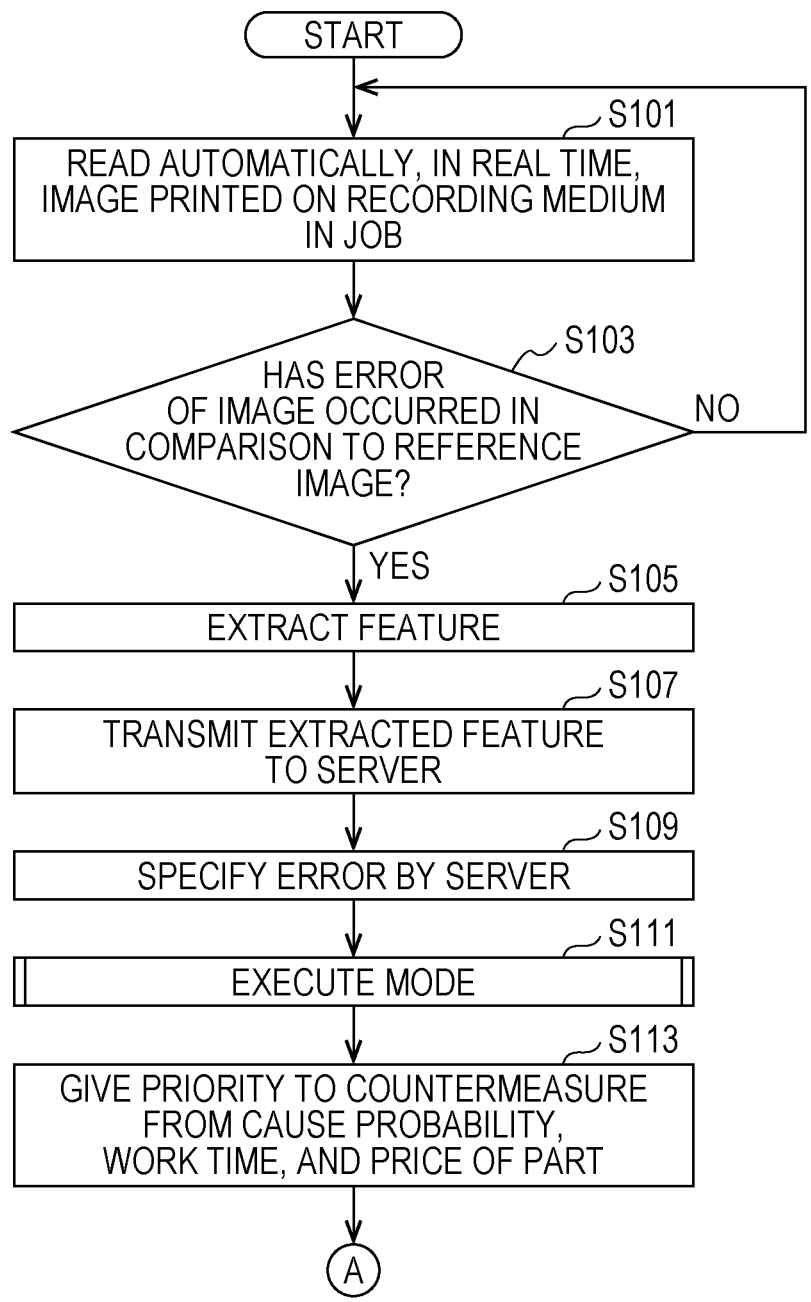

| DATE | TIME | MODEL | MACHINE SERIAL | TEMPERATURE | HUMIDITY | ERROR | FEATURE | | | | | | |
|---|---|---|---|---|---|---|---|---|---|---|---|---|---|
| | | | | | | | FD STREAK | | | CD STREAK | | | |
| | | | | | | | POSITION | LENGTH | WIDTH | LENGTH | WIDTH | PERIODICITY | |
| JULY 1 | 17:44 | X | 00000001 | 28°C | 50% | ABSENT | – | – | – | – | – | – | |
| JULY 1 | 17:44 | X | 00000001 | 28°C | 50% | PRESENT | 50mm | 420mm | 1mm | – | – | – | |
| JULY 1 | 17:46 | X | 00000001 | 28°C | 50% | PRESENT | 50mm | 420mm | 1mm | – | – | – | C |
| JULY 1 | 17:51 | X | 00000001 | 28°C | 50% | PRESENT | 50mm | 420mm | 1mm | – | – | – | C |
| JULY 1 | 17:58 | X | 00000001 | 28°C | 50% | ABSENT | – | – | – | – | – | – | E |
| JULY 2 | 10:10 | Y | 10000001 | 26°C | 60% | PRESENT | – | – | – | 297mm | 5mm | 70mm | D |
| JULY 2 | 10:45 | Y | 10000001 | 26°C | 60% | ABSENT | – | – | – | – | – | – | |
| JULY 4 | 15:10 | Y | 10000002 | 23°C | 40% | PRESENT | 50mm | 420mm | 1mm | – | – | – | CH |
| JULY 4 | 15:20 | Y | 10000002 | 23°C | 40% | PRESENT | 50mm | 420mm | 1mm | – | – | – | CH |
| JULY 4 | 15:50 | Y | 10000002 | 23°C | 40% | PRESENT | 50mm | 420mm | 1mm | – | – | – | C |

| DATE | TIME | MODEL | MACHINE SERIAL | TEMPERATURE | HUMIDITY | ERROR | RESPONSE | FD STREAK POSITION | LENGTH | WIDTH | DETERMINATION |
|---|---|---|---|---|---|---|---|---|---|---|---|
| JULY 1 | 17:44 | X | 00000001 | 28°C | 50% | ABSENT | | | | | |
| JULY 1 | 17:44 | X | 00000001 | 28°C | 50% | PRESENT | CLEANING OF CHARGED ELECTRODE | 50mm | 420mm | 1mm | × |
| JULY 1 | 17:46 | X | 00000001 | 28°C | 50% | PRESENT | REPLACEMENT OF CHARGED ELECTRODE | 50mm | 420mm | 1mm | × |
| JULY 1 | 17:51 | X | 00000001 | 28°C | 50% | PRESENT | REPLACEMENT OF DEVELOPING DEVICE | – | – | – | ○ |
| JULY 1 | 17:58 | X | 00000001 | 28°C | 50% | ABSENT | | | | | |
| JULY 2 | 10:10 | Y | 00000001 | 26°C | 60% | PRESENT | REPLACEMENT OF DEVELOPING DEVICE | – | – | – | ○ |
| JULY 2 | 10:45 | Y | 00000001 | 26°C | 60% | ABSENT | | | | | |
| JULY 4 | 15:10 | Y | 00000002 | 23°C | 40% | PRESENT | CLEANING OF CHARGED ELECTRODE | 50mm | 420mm | 1mm | × |
| JULY 4 | 15:20 | Y | 00000002 | 23°C | 40% | PRESENT | REPLACEMENT OF CHARGED ELECTRODE | 50mm | 420mm | 1mm | × |
| JULY 4 | 15:50 | Y | 00000002 | 23°C | 40% | PRESENT | REPLACEMENT OF DEVELOPING DEVICE | – | – | – | ○ |

| | CAUSE PROBABILITY | PRICE | WORK TIME |
|---|---|---|---|
| PART A | 60% | 10000 YEN | 30 MINUTES |
| PART B | 40% | 1000 YEN | 5 MINUTES |

| CASE | | CS1 | CS2 | CS3 | CS4 | CS5 | CS6 | CS7 | CS8 | CS9 | CS10 | TOTAL |
|---|---|---|---|---|---|---|---|---|---|---|---|---|
| CAUSE | | PART A | PART A | PART A | PART A | PART A | PART A | PART B | PART B | PART B | PART B | |
| COST (YEN) | IDEAL | 10000 | 10000 | 10000 | 10000 | 10000 | 10000 | 1000 | 1000 | 1000 | 1000 | 64000 |
| | REPLACE PART A FIRST | 10000 | 10000 | 10000 | 10000 | 10000 | 10000 | 11000 | 11000 | 11000 | 11000 | 104000 |
| | REPLACE PART B FIRST | 11000 | 11000 | 11000 | 11000 | 11000 | 11000 | 1000 | 1000 | 1000 | 1000 | 70000 |
| TIME (MINUTE) | IDEAL | 30 | 30 | 30 | 30 | 30 | 30 | 5 | 5 | 5 | 5 | 200 |
| | REPLACE PART A FIRST | 30 | 30 | 30 | 30 | 30 | 30 | 35 | 35 | 35 | 35 | 320 |
| | REPLACE PART B FIRST | 35 | 35 | 35 | 35 | 35 | 35 | 5 | 5 | 5 | 5 | 230 |

IMAGE PROCESSING SYSTEM FOR SPECIFYING COUNTERMEASURES AGAINST ERRORS, IMAGE FORMING SYSTEM, INFORMATION PROCESSING APPARATUS, INSPECTION METHOD, COUNTERMEASURE SPECIFYING PROGRAM, COUNTERMEASURE SPECIFYING SYSTEM, LEARNING APPARATUS, AND LEARNING METHOD

The entire disclosure of Japanese patent Application No. 2022-187158, filed on Nov. 24, 2022, is incorporated herein by reference in its entirety.

BACKGROUND

Technological Field

The present invention relates to an image processing system, an image forming system, an information processing apparatus, an inspection method, a countermeasure specifying program, a countermeasure specifying system, a learning apparatus, and a learning method.

Description of the Related Art

In recent years, as technology advances, an image processing system and an image forming system capable of printing at high speed and high image quality has been developed. In such an image processing system or an image forming system, when an error occurs in a printed image, it is sometimes difficult for a service person to find a countermeasure for eliminating the error.

JP 2022-127128 A describes an information processing apparatus capable of requesting maintenance of an image forming apparatus at a timing suitable for each image forming apparatus.

The abstract of the information processing apparatus of JP 2022-127128 A describes that "an information processing apparatus that generates an alert for prompting maintenance of an image forming apparatus that forms an image on a sheet-like recording medium includes a defect information creator/holder that calculates a defect level of a defect occurring in an inspection image read from the recording medium and stores the defect level in time series as a defect level history, a maintenance information creator/holder that detects execution of the maintenance of the image forming apparatus, extracts the defect level at the time of detecting the execution of the maintenance from the defect level history stored in the defect information creator/holder, and calculates and holds a defect level threshold on the basis of the extracted defect level, and an alert generator that compares the defect level calculated by the defect information creator/holder with the held defect level threshold, and generates an alert when the defect level is in a range in which image quality is inferior to the defect level threshold".

In addition. JP2021-51133A describes a failure location specification system capable of specifying a failure location with high accuracy.

The abstract of the failure location specification system of JP2021-51133A describes that "a system specifies a failure location of an image forming apparatus that forms an image on a recording medium, the system including a missing defect extractor that compares image data of an image formed before a replacement of a part constituting the image forming apparatus with image data of an image formed after the replacement of the part, and extracts a defect that exists in the image before the replacement of the part and does not exist in the image after the replacement of the part, a specific information holder that holds specific information that associates a feature of the extracted defect and specification information of the replaced part with each other, and a part specifier that specifies a part that is a generation factor of the defect on the basis of the feature of the defect generated in the image formed in the image forming apparatus and the specific information held in the specific information holder".

When an error occurs in the image, the service person adjusts a machine, cleans the machine, or replaces a failed part in order to eliminate the error. When the cause of the error is clear, the service person can handle the error by adjusting the machine, cleaning the machine, or replacing a part related to the error. However, in the case of an error of which cause is unknown, the service person needs to assume a plurality of possible causes of the error, and adjust the machine, clean the machine, and replace a part suspected to be the cause of the assumed error.

Therefore, when the service person does not know the cause of the error, the service person needs to not only adjust and clean the machine related to the assumed error but also replace the parts one after another, and take much labor and work time for taking countermeasures against the error.

SUMMARY

In relation to such a problem, an object of the present invention is to reduce labor and work time of a service person required for countermeasures against errors and suppress unnecessary replacement of parts.

To achieve the abovementioned object, according to an aspect of the present invention, an image processing system reflecting one aspect of the present invention comprises: an image reader that reads an image formed on a recording medium: an inspector that performs an inspection of an error of the image read by the image reader, and a specifier that specifies a countermeasure on a basis of information related to a result of the inspection by the inspector and a predetermined proposal condition.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5A is an explanatory diagram (1) showing a relationship between a classification and features of an image when errors of the image occur:

FIG. 5B is an explanatory diagram (2) showing the relationship between the classification and the features of an image when errors of the image occur:

FIG. 6A is a flowchart (1) showing processing of proposing a countermeasure to a service person when an error occurs in the image forming apparatus:

FIG. 7A is an explanatory diagram (1) showing an example of an error list of the image forming apparatus stored in the server:

FIG. 7B is an explanatory diagram (2) showing an example of the error list of the image forming apparatus stored in the server:

FIG. 9A is a cost calculation table showing a relationship between a cause probability, a price, and a work time for each part corresponding to a countermeasure; and FIG. 9B is a priority calculation table for calculating an appropriate priority from the cause probability, the price, and the work time.

DETAILED DESCRIPTION OF EMBODIMENTS

Hereinafter, one or more embodiments of the present invention will be described with reference to the drawings. Note that the embodiment described below is an example for implementing the present invention, and should be appropriately modified or changed in accordance with the configuration of the apparatus to which the present invention is applied and various conditions, and the scope of the invention is not limited to the disclosed embodiments. The same members are denoted by the same reference signs, and the description thereof will be omitted as appropriate.

Embodiment

[Overall Configuration of Image Processing System]

Figure 1:
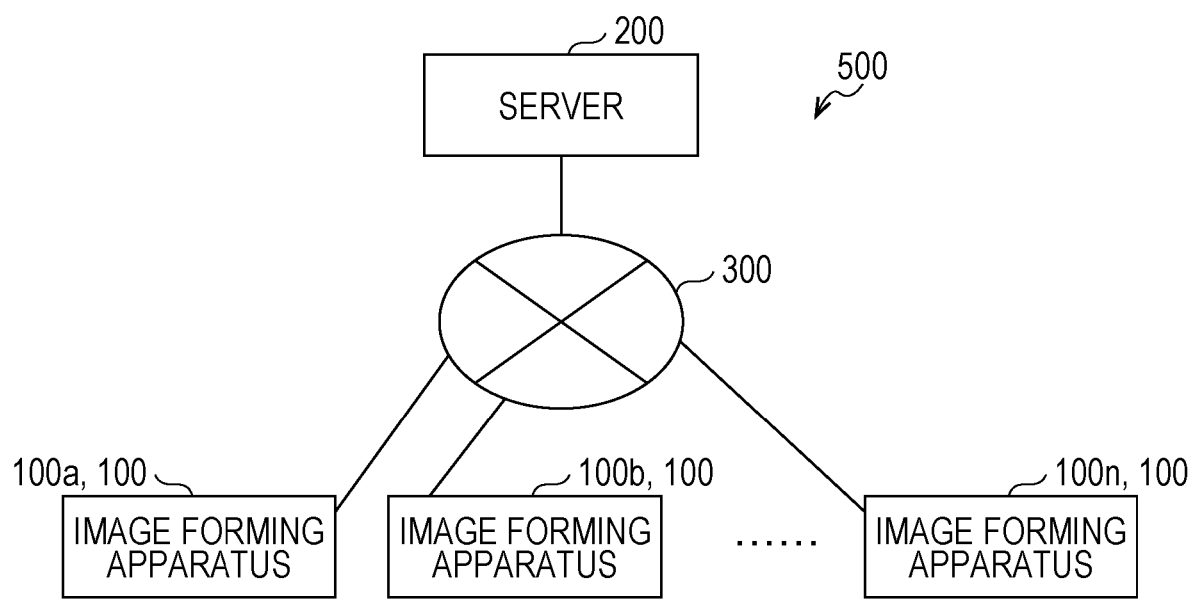
FIG. 1 is an explanatory diagram showing a schematic configuration of an image processing system according to an embodiment.

FIG. 1 is an explanatory diagram showing a schematic configuration of an image processing system 500 according to an embodiment. The image processing system 500 includes image forming apparatuses 100a and 101b to 100n and a server 200. The elements constituting the image processing system 500 are mutually connected to a network 300.

Each of the image forming apparatuses 100a to 100n represents an image forming apparatus, and is simply referred to as image forming apparatus 100 when it is not necessary to specify any image forming apparatus. Hereinafter, a configuration of each apparatus will be described.

[Configuration of Image Forming Apparatus]

Figure 2:
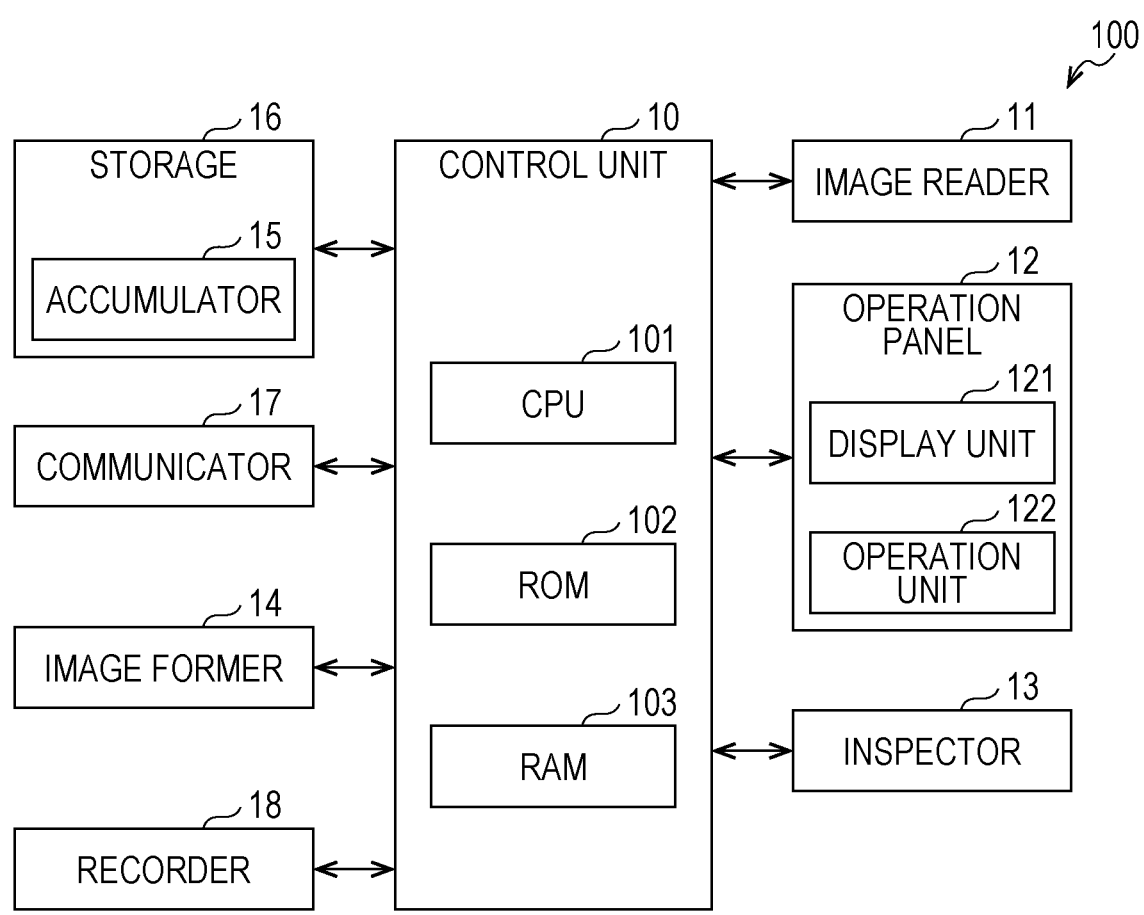
FIG. 2 is an explanatory diagram showing a schematic configuration of an image forming apparatus according to the embodiment.

FIG. 2 is an explanatory diagram showing a schematic configuration of the image forming apparatus 100 according to the embodiment. The image forming apparatus 100 includes a control unit 10, an image reader 11, an operation panel 12, an inspector 13, an image former 14, an accumulator 15, a storage 16, a communicator 17, and a recorder 18.

The control unit 10 includes a central processing unit (CPU) 101, a read only memory (ROM) 102, a random access memory (RAM) 103, and the like. The CPU 101 reads a program from the storage 16 or the ROM 102, develops the program in the RAM 103, and executes the program to control each component of the image forming apparatus 1. At this time, various data stored in the storage 16 are referred to.

The storage 16 includes, for example, a nonvolatile semiconductor memory (so-called flash memory) or a hard disk drive.

The control unit 10 transmits and receives various data to and from an external device (for example, the server 200 or the like) connected to a communication network (for example, the network 300) such as a local area network (LAN) or a wide area network (WAN) via the communicator 17. For example, the control unit 10 receives image data transmitted from an external device, and causes the image former 14 to form a toner image on a recording medium on the basis of the image data. The control unit 10 controls each component included in the image forming apparatus 100. The control unit 10 may be referred to as a "control device" or a "controller".

The communicator 17 includes, for example, a communication control card such as a network interface card (NIC).

The image former 14 forms an image on a recording medium. The image former 14 includes a secondary transfer unit and a fixing device. The secondary transfer unit transfers the toner image on an intermediate transfer belt to a recording medium. The fixing device heats and pressurizes the recording medium to which the toner image has been transferred at a fixing nip to fix the toner image.

The image reader 11 reads the image formed on the recording medium by the image former 14. The image reader 11 includes an automatic document feeder (ADF) device and a scanner. The ADF device conveys one or more documents placed on a document tray by a conveying mechanism and sends the documents to the scanner. The scanner optically scans a document conveyed onto a contact glass from the ADF device or a document placed on the contact glass. The scanner forms an image of reflected light from the document on a light receiving surface of a charge coupled device (CCD) sensor, and reads the document image. The image reader 11 generates input image data (read image) on the basis of a reading result by the scanner.

The operation panel 12 includes, for example, a liquid crystal display (LCD) with a touch panel. The operation panel 12 includes a display unit 121 and an operation unit 122. The display unit 121 includes, for example, a liquid crystal display, and displays various operation screens, an image state, an operation status of each function, and the like under the control of the control unit 10. The operation unit 122 includes, for example, a touch panel and various operation keys such as a numeric keypad and a start key, receives various input operations by a user, and outputs an operation signal to the control unit 10.

The inspector 13 inspects an error of the image data (read image) read by the image reader 11. The inspector 13 compares the read image with a reference image to inspect (determine) whether an error has occurred in the read image.

The accumulator 15 is configured as a part of the storage 16, and accumulates, as an example, information related to a result of the inspection and a countermeasure corresponding to the information. The accumulator 15 accumulates at least one of machine data or environment data of the image forming apparatus 100. The machine data is, for example, a parameter related to each member of the image forming apparatus 100. The environment data is, for example, a temperature or humidity inside a housing of the image forming apparatus 100 or a temperature or humidity outside the housing. A specifier 21 described later refers to the machine data and/or the environment data to specify a countermeasure against an error. The machine data and/or environment data are included in the information related to the result of the inspection.

The recorder 18 includes, for example, a camera or a microphone, and records a work content and a work time of a service person in a video or an audio. For example, the recorder 18 automatically records, in the accumulator 15, the work content and the work time of the service person in a video by a camera or in a voice by a voice recorder.

[Configuration of Server]

Figure 3A:
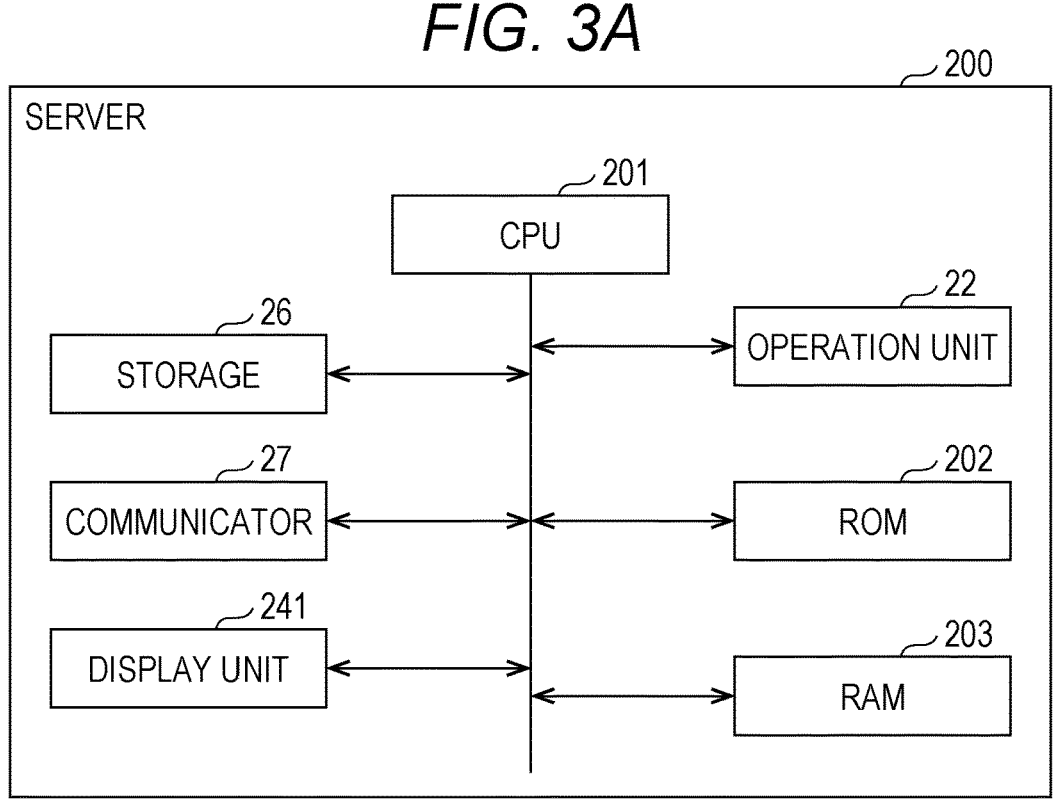
FIG. 3A is an explanatory diagram showing a physical configuration of a server according to the embodiment.

FIG. 3A is an explanatory diagram showing a physical configuration of the server 200 according to the embodiment.

The server 200 includes a CPU 201, a ROM 202, the RAM 103, an operation unit 22, a storage 26, a communicator 27, and a display unit 241.

The CPU 201 controls each component of the server 200 by reading and executing a program from the ROM 202 or the storage 26. At this time, various data stored in the storage 26 are referred to. The storage 26 includes a mass storage medium such as a semiconductor memory or a hard disk drive, for example.

The CPU 201 transmits and receives various data to and from an external device (for example, the image forming apparatuses 100a to 100n and the like) connected to a communication network (for example, the network 300) such as a LAN or WAN via the communicator 27. For example, the CPU 201 receives image data transmitted from an external device, and specifies a countermeasure on the basis of the image data.

The communicator 27 includes, for example, a communication control card such as an NIC.

The operation unit 22 includes various operation keys such as a numeric keypad and a start key. The operation unit 22 receives various input operations by the user and outputs an operation signal to a control unit 20.

The display unit 241 is, for example, a liquid crystal display or the like, and displays characters, figures, images, and the like.

Figure 3B:
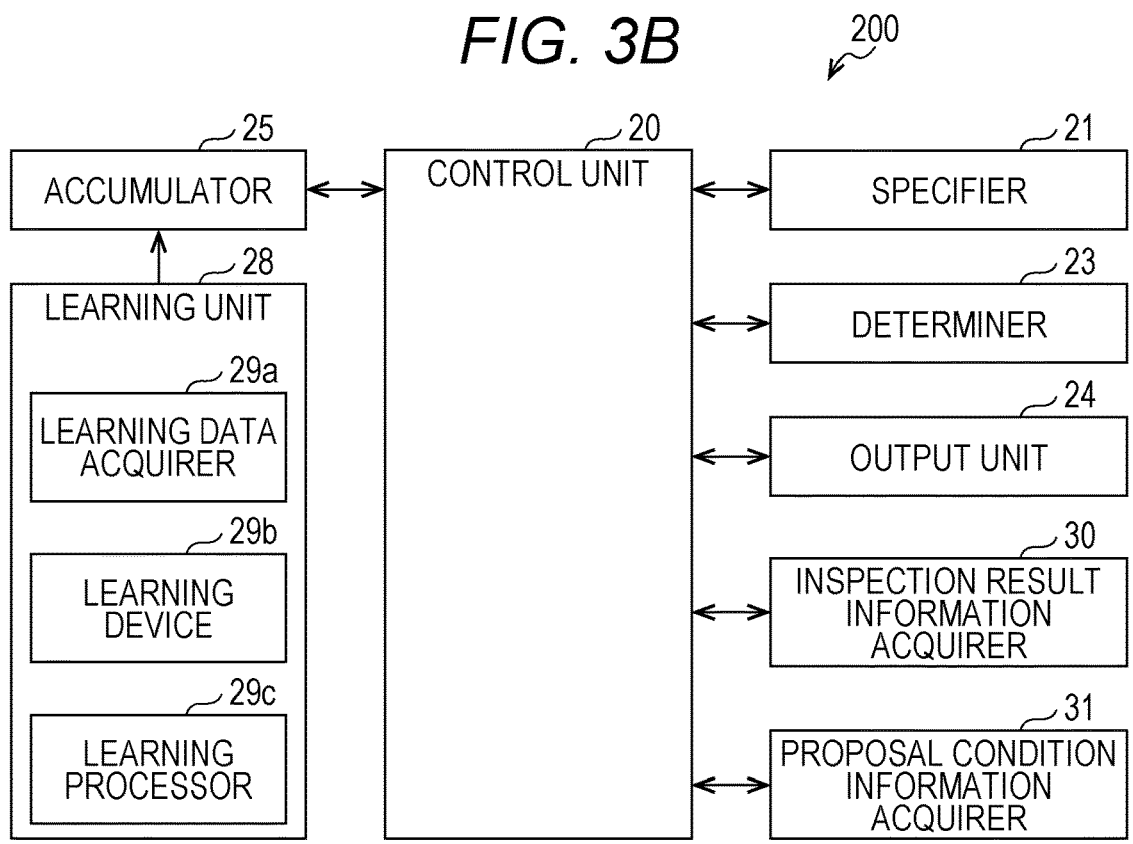
FIG. 3B is an explanatory diagram showing a logical configuration of the server according to the embodiment.

FIG. 3B is an explanatory diagram showing a logical configuration of the server 200 according to the embodiment.

The server 200 includes the control unit 20, a specifier 21, the operation unit 22, a determiner 23, an outputter 24, an accumulator 25, a learning unit 28, an inspection result information acquirer 30, and a proposal condition information acquirer 31. Note that the specifier 21, the determiner 23, and the learning unit 28 are provided in the server 200, but may be provided in the image forming apparatuses 100a to 100n, for example.

The control unit 20 is embodied by the operations of the CPU 201, the ROM 202, and the RAM 103, and integrally controls the server 200. The control unit 20 may be referred to as a "control device" or a "controller".

The inspection result information acquirer 30 acquires inspection result information on an inspection result of an image formed on a recording medium of the image forming apparatus 100. The inspection result information is features of images before and after an elimination of an error (before and after a response) that are generated by the inspector 13 of the image forming apparatus 100, features of a machine before and after the elimination of the error (before and after the response), and the work content and the work time of a service person. The inspection result information acquirer 30 acquires the inspection result information from any of the image forming apparatuses 100a to 100n via the network 300 by the communicator 27.

The proposal condition information acquirer 31 acquires information related to a predetermined proposal condition. The predetermined proposal condition is a condition based on at least one of a probability of a cause of an error (also referred to as cause probability) according to the result of the inspection, the work time, a price of a replacement part, or a customer satisfaction level. Here, the customer satisfaction level is a condition such as a time until an error of an image is corrected, an improvement level of the image error, an interval until recurrence, presence or absence of an additional measure for recurrence prevention, availability of emergency treatment by panel operation, an assumed mechanism, and availability of presentation of an error occurrence condition. For example, the proposal condition information acquirer 31 acquires proposal condition information input by the service person to the operation unit 122 of the image forming apparatus 100.

The specifier 21 specifies a countermeasure on the basis of the information related to the result of the inspection by the inspector 13 of the image forming apparatus 100 and the predetermined proposal condition. Here, the countermeasure is, for example, a specific work performed by a service person on the image forming apparatus 100 in which an error of an image occurs, and here, refers to adjustment or cleaning of the image forming apparatus 100 and replacement of parts.

When an error occurs in a certain image forming apparatus 100 connected via the network 300 and an example of the same error of an image forming apparatus having the same configuration as the image forming apparatus has been accumulated in the accumulator 25, the specifier 21 specifies a countermeasure on the basis of the example of the error of the image forming apparatus having the same configuration.

Furthermore, when an error occurs in a certain image forming apparatus 100 connected via the network 300 and an example of the same error of an image forming apparatus having a different configuration from the image forming apparatus has been accumulated in the accumulator 25, the specifier 21 specifies a countermeasure on the basis of the example of the same error regardless of the configuration of the image forming apparatus.

For example, in a case where an error of a cross feeding direction (CD) streak occurs in the image forming apparatus 100 using a unique rotating member, and a cycle of the error coincides with a circumferential length of the rotating member, the specifier 21 determines that the error is unique to an image forming apparatus having the same configuration using the unique rotating member. At this time, the specifier 21 specifies a countermeasure on the basis of the example of the error of the CD streak of the image forming apparatus having the same configuration. Note that the CD streak refers to a streak generated in a direction perpendicular to a sheet passing direction.

In addition, in a case where the same feed direction (FD) streak error occurs in a plurality of image forming apparatuses of different models, the specifier 21 determines that the error is not an error unique to the model. At this time, the specifier 21 specifies a countermeasure on the basis of all the examples of the error of the FD streak of the image forming apparatus accumulated in the accumulator 25. Note that the FD streak refer to a streak generated in parallel to the sheet passing direction.

In addition, when there is a plurality of candidates for countermeasures, the specifier 21 gives a priority to a plurality of countermeasures on the basis of the proposal condition. Note that a specific example in which the specifier 21 gives a priority to countermeasures will be described with reference to flowcharts of FIGS. 6A and 6B described later.

In a case where a priority is given to the plurality of countermeasures, the specifier 21 may execute a mode for isolating a cause of an error of an image. Note that a specific example in which the specifier 21 executes the mode for isolating the cause of the error will be described with reference to the flowchart of FIG. 8.

The determiner 23 determines whether the error of the image has been eliminated. A threshold for determining whether the error of the image has been eliminated is variable. Whether the error has been eliminated is not required to be mechanically determined by the determiner 23, but may be determined and input by a service person. For example, in a case where the service person determines, whether there is an error depends on individual differences of service persons even with the same image. Therefore, the determiner 23 desirably mechanically determines whether an image printed on a recording medium has an error.

The outputter 24 outputs the countermeasure information specified by the specifier 21. The outputter 24 transmits (outputs) the specified countermeasure information to the image forming apparatus 100 and causes the display unit 121 to display the countermeasure information. As a result, the image processing system 500 can notify a service person who repairs the image forming apparatus 100 of a countermeasure against the error.

The accumulator 25 is configured as a part of the storage 26, for example, and accumulates, as an example, information related to the inspection result inspected by the inspector 13 of the image forming apparatus 100 and a countermeasure corresponding to the information. In addition, when the determiner 23 determines that the error of the image has been eliminated, the accumulator 25 may accumulate the countermeasure as an example.

The learning unit 28 includes a learning data acquirer 29a, a learning device 29b, and a learning processor 29c. The learning data acquirer 29a acquires, as learning data (teacher data), from the accumulator 25, the inspection result information related to the inspection result of the image formed on the recording medium, the proposal condition information related to the predetermined proposal condition, and the countermeasure information related to the countermeasure. Here, the proposal condition information and the inspection result information of the error are example problems, and the countermeasure that has successfully eliminated the error is a correct answer.

The learning processor 29c causes the learning device 29b to output specific countermeasure information when the inspection result information and the proposal condition information are input on the basis of the inspection result information, the proposal condition information, and the countermeasure information acquired by the learning data acquirer 29a. The specifier 21 inputs the inspection result information of the error and the predetermined proposal condition to the learned learning device 29b, and specifies a countermeasure that eliminates the error. The server 200 embodying the learning unit 28 functions as a learning apparatus that learns the proposal condition information and the inspection result information of the error as example problems and the countermeasure as a correct answer.

[Configuration of Information Processing Apparatus]

The server 200 in FIGS. 3A and 3B includes the accumulator 25, the inspection result information acquirer 30, the proposal condition information acquirer 31, the specifier 21, and the outputter 24, and functions as an information processing apparatus.

Note that the inspector 13 and the specifier 21 may be provided in the server 200 and communicably connected to the image forming apparatus 100 via the network 300. In addition, the image forming apparatus 100 may be without the accumulator 15, and the system may be configured only by the accumulator 25 of the server 200.

[Processing of Accumulating Error Example]

Processing in which the image processing system 500 according to the embodiment accumulates an example of an error will be described.

Figure 4:
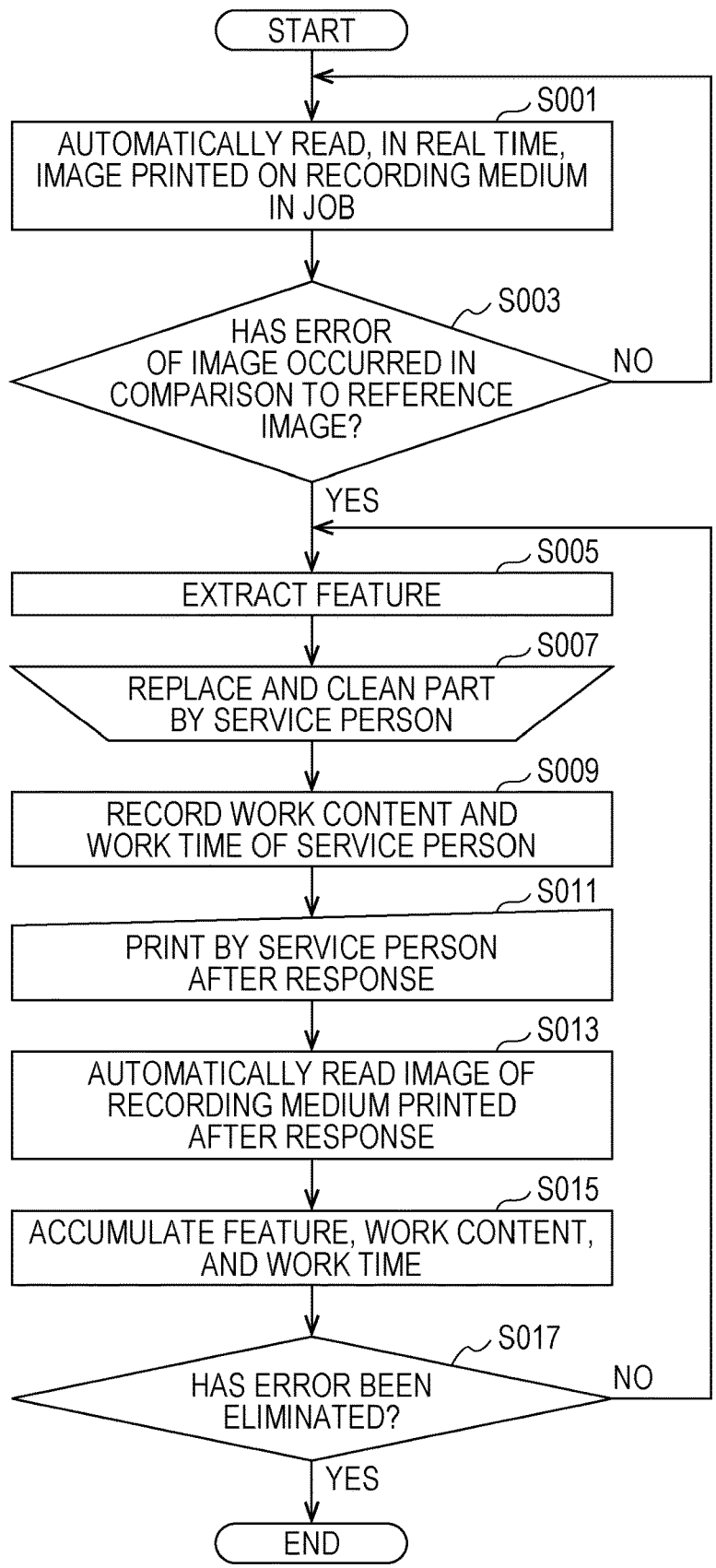
FIG. 4 is a flowchart showing processing in which the image processing system according to the embodiment accumulates an error occurring in the image forming apparatus.

FIG. 4 is a flowchart showing the processing in which the image processing system 500 according to the embodiment accumulates an error occurring in the image forming apparatus 100.

The image processing system 500 causes the image reader 11 to automatically read, in real time, an image printed on a recording medium in a job executed by the image forming apparatus 100 (step S001).

The inspector 13 of the image forming apparatus 100 compares the read image read by the image reader 11 with the reference image to inspect whether an error of the image has occurred (step S003).

In step S003, when no error of the image has occurred (No), the inspector 13 returns to step S001. On the other hand, when an error of an image has occurred in step S003 (Yes), the inspector 13 proceeds to step S005.

In step S005, the inspector 13 acquires a difference between the read image and the reference image, and extracts the acquired difference as a feature to inspect the error of the image. The reference image is an image printed correctly by the image forming apparatus 100 and read by the image reader 11. Note that the reference image may be print image data.

FIGS. 5A and 5B are explanatory diagrams showing a relationship between a classification and features of an image when errors of the image occur. In FIGS. 5A and 5B, there are columns of the classification of errors and the feature of an image, and the classification of errors and the feature of the image are saved.

For example, as shown in FIG. 5A, features when an FD streak or a CD streak occurs as an error of an image are an interval of the FD streak, a width of the streak, a sharpness of the streak, a density difference of the streak, an occurrence position, a common streak, a gloss difference, and the like. Features when dirt such as a black spot occurs are a size, a number (frequency), an occurrence position (distribution), a shape, a color (single color or mixed color), and the like. Features when a void image such as a white spot occurs are a size, a number (frequency), an occurrence position (distribution), a shape, and the like.

Furthermore, as shown in FIG. 5B, in addition to the image data, the inspector 13 may acquire parameters related to each member, such as development, transfer, and fixing, and environment data such as temperature and humidity. Features of the machine related to dirt are a primary transfer output and a secondary transfer output. Features of the machine related to the FD streak is a fixing air volume, a fixing upper temperature, a fixing lower temperature, a fixing nip pressure, a PFU suction air volume, and a density balance adjustment value. Features of the machine related to the CD streak is a screen and an AC bias fine adjustment value. Features of the machine related to unevenness include a development output adjustment value, a fog margin fine adjustment value, a toner density adjustment value, a toner charging amount, bulk detection, a gamma offset adjustment value, a raster image processor (RIP) format, development AC frequency fine adjustment, and a primary transfer static eliminating electrode output. Features of the machine related to an entire error include feed speed setting, linear velocity, coverage, environment (temperature or humidity), and speed of each member.

Note that the features shown in FIGS. 5A and 5B are examples and are not limited.

Returning to FIG. 4, the description will be continued. The service person adjusts the machine, cleans the machine, or replaces parts in order to respond to an error of an image generated in the image forming apparatus 100 (step S007). At that time, the recorder 18 automatically records the work content of the service person, the work time required for responding to the error, and the like (step S009).

Note that the service person may manually input his/her work content, the work time required for responding to the error, and the like to the operation unit 122 of the image forming apparatus 100. However, if the service person manually inputs the work content or the work time required for responding to the error, there is a possibility that the operation takes time and omission occurs. Therefore, the recorder 18 desirably automatically records the work content or the work time required for responding to the error.

When the service person instructs printing after completion of the response (step S011), the image former 14 prints an image on a recording medium. Thereafter, the image reader 11 automatically reads the image on the recording medium printed after the response (step S013).

The accumulator 15 and the accumulator 25 accumulate the features of the images before and after the elimination of the error (before and after the response), the features of the machines before and after the elimination of the error (before and after the response), the work content and the work time of the service person, and the machine data and the environment data of the image forming apparatus 100 in association with each other (step S015). Thereafter, the determiner 23 determines whether the error of the image is eliminated (step S017).

In step S017, when the error of the image is eliminated (Yes), the determiner 23 ends the processing of FIG. 4. On the other hand, in step S017, when the error of the image is not eliminated (No), the determiner 23 returns to step S005. Then, the image forming apparatus 100 continues to receive processing such as repair of the machine, cleaning of the machine, or replacement of parts by the service person.

In the embodiment, the accumulator 15 accumulates, as an example, the features of the images before and after the elimination of the error, which are the results of the inspection, the features of the machines before and after the elimination of the error, the work content of the service person as a countermeasure, and the work time in association with each other. As a result, the specifier 21 can specify a more appropriate countermeasure. The control unit 10 transmits the content accumulated by the accumulator 15 of the image forming apparatus 100 to the server 200 by the communicator 17. As a result, the same countermeasure as the countermeasure accumulated in the accumulator 15 of each image forming apparatus 100 is accumulated in the accumulator 25 of the server 200. Therefore, when the same error as the error of the image generated in another image forming apparatus 100 occurs, the specifier 21 can specify an appropriate countermeasure on the basis of the example of the same error accumulated in the accumulator 25. Then, the image processing system 500 can present (propose) a more appropriate countermeasure to the service person.

[Processing of Proposing by Server]

Figure 6B:
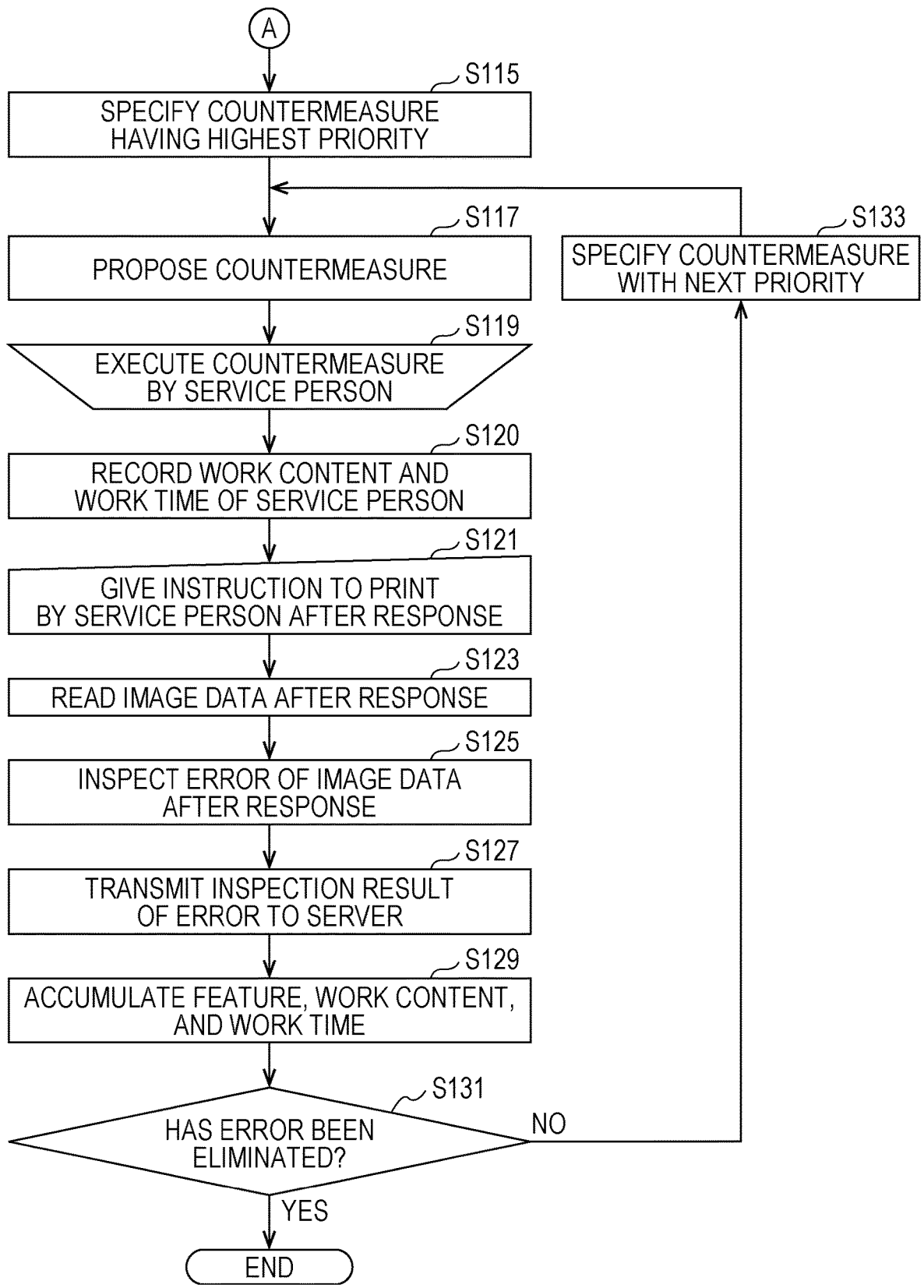
FIG. 6B is a flowchart (2) showing processing of proposing a countermeasure to a service person when an error occurs in the image forming apparatus.

FIGS. 6A and 6B are flowcharts showing processing of proposing a countermeasure to a service person when an error occurs in an image of the image forming apparatus 100. FIGS. 6A and 6B are characterized in that (1) an example having a feature of the error is specified and a countermeasure is proposed to the service person. (2) priority can be determined on the basis of a predetermined proposal condition, and (3) a work time after power of the machine is turned off until the error of the image is eliminated is presented.

As a premise, the server 200 includes the accumulator 25 having accumulated sufficient examples.

First, the image processing system 500 causes the image reader 11 to automatically read, in real time, an image printed on a recording medium in a job executed by the image forming apparatus 100 (step S101).

The inspector 13 of the image forming apparatus 100 compares the read image read by the image reader 11 with the reference image to inspect whether an error of the image has occurred (step S103).

In step S103, when no error of the image has occurred (No), the inspector 13 returns to step S101. On the other hand, when an error of an image has occurred in step S103 (Yes), the inspector 13 proceeds to step S105.

In step S105, the inspector 13 acquires a difference between the read image and the reference image, and extracts the acquired difference as a feature to inspect the error of the image.

In step S107, the control unit 10 of the image forming apparatus 100 in which the error has occurred transmits the feature extracted by the inspector 13 to the server 200 by the communicator 17. The control unit 20 of the server 200 receives, by the communicator 27, the extracted feature and stores the feature in the accumulator 25. The control unit 20 updates the error list 260 of the accumulator 25 and stores the feature acquired from the image forming apparatus 100.

FIGS. 7A and 7B are explanatory diagrams showing an example of the error list 260 of the image forming apparatus 100 stored in the server 200. The error list 260 shown in FIGS. 7A and 7B includes, for example, columns of date, time, model of the image forming apparatus 100, machine serial, temperature, humidity, error, feature, response. FD streak. CD streak, and determination.

The date of occurrence of the error is stored in the date column, and the time of occurrence of the error is stored in the time column. The model name of the apparatus in which the error has occurred is stored in the model column. The machine serial column stores the serial number of the apparatus in which the error has occurred. The temperature at the time of occurrence of the error is stored in the temperature column. The humidity at the time of occurrence of the error is stored in the humidity column.

The presence or absence of occurrence of an error is stored in the error column. A feature obtained by quantifying an error is stored in the feature column. Specifically, information of the position, length, and width of the FD streak and the position, length, and width of the CD streak is stored.

A countermeasure executed by the service person is described in the response column in FIG. 7B. A determination result as to whether the error has been eliminated is stored in the determination column. Note that "o" indicates that the error has been eliminated, and "x" indicates that the error has not been eliminated.

For example, the error list 260 in FIG. 7A indicates that a model X indicating the image forming apparatus 100a has a first error at 17:44, a second error at 17:46, and a third error at 17:51 on July 1.

As for the error shown in the second row of the error list 260 in FIG. 7B, a charged electrode is cleaned as shown in the response column, but the error is not eliminated as shown in the determination column. As for the second error shown in the third row, the charged electrode is replaced as shown in the response column, but the error is not eliminated as shown in the determination column. As for the third error shown in the fourth row, the error is eliminated as shown in the determination column by replacing a developing device as shown in the response column.

When acquiring the extracted feature, the server 200 adds the acquired feature to the error list 260 in FIGS. 7A and 7B and updates the error list 260. Note that the error list 260 is stored in the storage 26.

Returning to FIG. 6A, the description will be continued. The server 200 specifies an error of the image forming apparatus 100 by the specifier 21 (step S109).

Here, when the server 200 issues an instruction to cause the image forming apparatus 100 to execute an error factor isolation mode, the image forming apparatus 100 executes the error factor isolation mode (step S111). The error factor isolation mode is, for example, a mode for isolating an error factor before proposing a countermeasure to the service person when an error of an image occurs.

Figure 8:
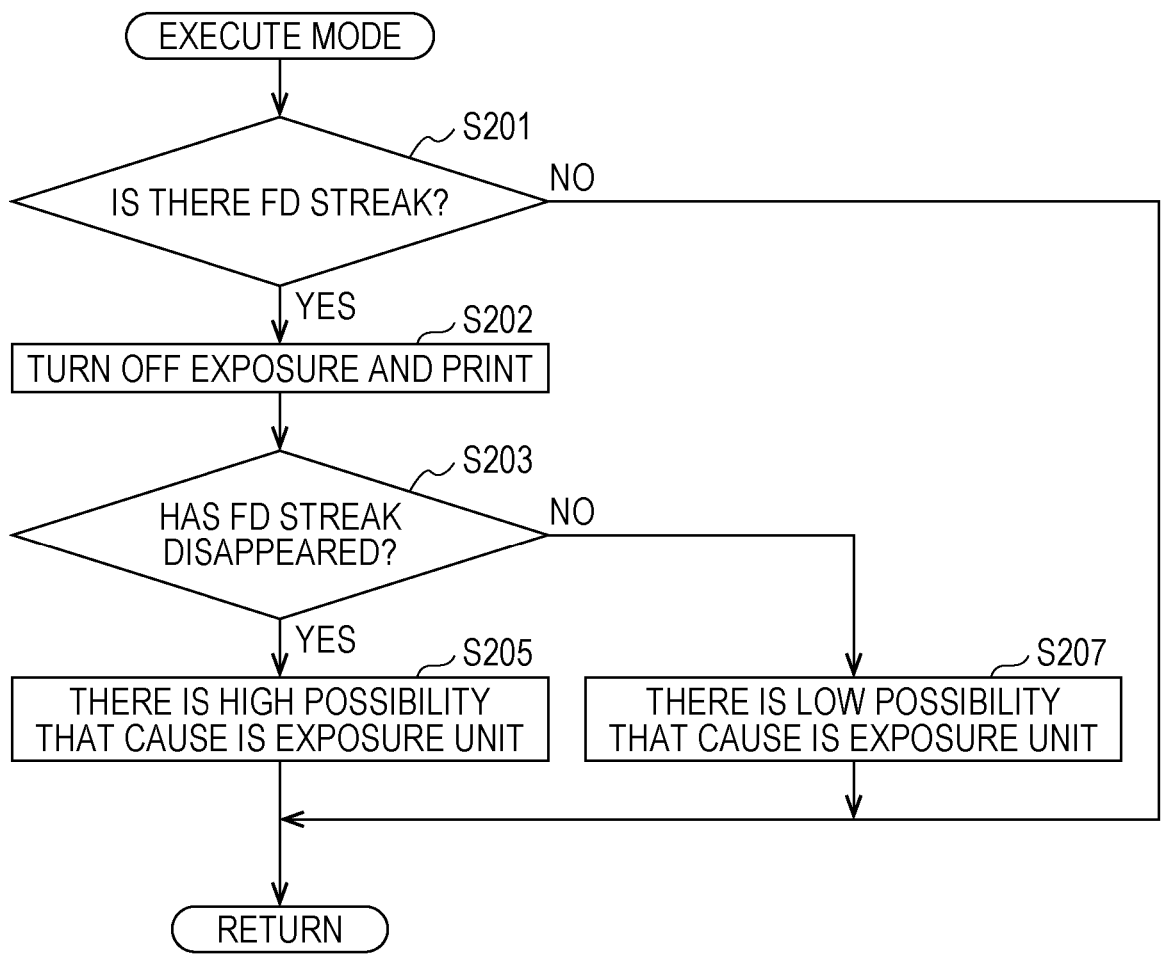
FIG. 8 is a flowchart showing execution of a mode for isolating an error factor as to whether an exposure unit is a generation factor when an FD streak occurs in an image.

FIG. 8 is a flowchart showing execution of a mode for isolating an error factor as to whether an exposure unit is a generation factor when an FD streak occurs in an image.

As shown in FIG. 8, the inspector 13 of the image forming apparatus 100 determines whether there is an FD streak in the image (step S201).

In step S201, when there is an FD streak in the image (Yes), the inspector 13 proceeds to step S202. On the other hand, in step S201, when there is no FD streak in the image (No), the inspector 13 ends the processing of FIG. 8.

In step S202, the control unit 10 causes the image former 14 to turn off the exposure and print an image on a recording medium. Specifically, in step S202, while a white solid image is being printed, the control unit 10 of the image forming apparatus 100 changes a photoconductor potential to a positive side of a development DC bias with the exposure unit turned off, and causes fogging development to be executed. Thereafter, the image reader 11 reads the recording medium.

In step S203, the determiner 23 determines whether the FD streak has disappeared as a result of printing with the exposure turned off. In step S203, when the FD streak disappears (Yes), the determiner 23 determines that there is a high possibility that the cause is the exposure unit (step S205), and ends the processing of FIG. 8.

On the other hand, in step S203, when the FD streaks do not disappear (No), the determiner 23 determines that there is a low possibility that the cause is the exposure unit (step S207), and ends the processing of FIG. 8. Note that the service person may determine whether the FD streak has disappeared.

Returning to FIG. 6A, the description will be continued. The specifier 21 of the server 200 gives priority to the plurality of countermeasures from the probability of the cause of the error, the work time, and the price of the replacement part (step S113). Note that, when there is a plurality of candidates for countermeasures, the specifier 21 can give a priority to a plurality of countermeasures on the basis of the proposal condition.

Priority assignment will be described with reference to FIGS. 9A and 9B. FIG. 9A is a cost calculation table 261 showing a relationship between the cause probability, the price, and the work time for each part corresponding to the countermeasure. FIG. 9B is a priority calculation table 262 for calculating an appropriate priority from the cause probability, the price, and the work time. The cost calculation table 261 in FIG. 9A and the priority calculation table 262 in FIG. 9B are both stored in the storage 26.

The cost calculation table 261 includes a cause probability column, a price column, and a work time column in a column direction. The cost calculation table 261 includes a row indicating a part to be replaced by a service person in a row direction.

The first row of the cost calculation table 261 in FIG. 9A indicates that, if the service person replaces a part A for a certain error, the probability that the error will be eliminated is 60%, the price of the part A is 10000 yen, and the work time required for the replacement is 30 minutes. On the other hand, the second row of the cost calculation table 261 indicates that, if the service person replaces a part B for a certain error, the probability that the error will be eliminated is 40%, the price of the part B is 1000 yen, and the work time required for the replacement is 5 minutes.

FIG. 9A will be described in detail. For example, in a case where the same type of error occurs ten times in the same image forming apparatus 100, the number of times the service person replaces the part A to eliminate the error is six on average, and the number of times the service person replaces the part B to eliminate the error is four on average. In addition, in a case where the same type of error occurs once in each of ten different image forming apparatuses 100, it is indicated that the number of apparatuses in which the error is eliminated by replacing the part A is six on average, and the number of apparatuses in which the error is eliminated by replacing the part B is four on average.

Here, in a comparative conyentional technique, the specifier 21 has proposed to replace the part A first without considering the price of the part and the work time.

On the other hand, in the embodiment, for example, it is proposed to replace the part B from the following Equation (1) in consideration of the price of the part and the work time.

[Equation 1]

$$Ct=(Co+h\times La)\times Cp \qquad (1)$$

where
Ct is a cost required for a countermeasure.
Co is a price of a part.
h is a work time.
La is an expense for labor, and
Cp is a cause probability.

The values in FIG. 9A are used for the price of the part, the work time, and the cause probability, as an example, and when costs Ct required for the countermeasure are the same value, a countermeasure requiring the shorter work time is prioritized.

FIG. 9B shows a step of calculating a cost associated with the replacement of the part A or the part B and calculating the priority in a cost effective manner. Specifically, the cost Ct required for the countermeasure is calculated in consideration of each of first replacement of the part A and first replacement of the part B.

As shown in FIG. 9B, cases CS1 to CS10 are set in consideration of ten times of occurrence of the same type of error in the image forming apparatus 100.

The row of cause indicates a cause of an error. In this case, the cause of the error of the cases CS1 to CS6 is deterioration of the part A. On the other hand, the cause of the error of the cases CS7 to CS10 is deterioration of the part B.

When the error has not been eliminated by replacing the part, the service person does not perform the replacement again to restore the originally used part to an original state. This is in consideration of the fact that if the service person replaces the part to the original part again, the same work time is required for a replacement work to restoring, and that a counter for measuring the number of times of use of the part is reset at the time of replacing the part, and a measurement value of the counter cannot be returned to an original state.

The row of ideal of cost stores a cost of the part for ideal error elimination. Ideally, in the cases CS1 to CS6, since the error is eliminated by replacing only the part A. 10000 yen is stored in the row of ideal. In the cases CS7 to CS10, since the error is eliminated by replacing only the part B. 1000 yen is stored in the row of ideal. In this case, the total column stores 64000 yen, which is the sum of the price of the part A of 10000 yen×six cases (cases CS1 to CS6) and the price of the part B of 1000 yen×four cases (cases CS7 to CS10).

The row of cost of "first replacement of part A" stores a total cost of eliminating the error when the part A is replaced. In the cases CS1 to CS6, since the error is eliminated by replacing the part A, the row of "first replacement of part A" stores the price of the part A of 10000 yen.

Here, in the cases CS7 to CS10, since the part B is the cause of the error, the error is not eliminated by replacing the part A. Therefore, in the cases CS7 to CS10, it is necessary to further replace the part B after replacing the part A. In the cases CS7 to CS10, the row of "first replacement of part A" stores 11000 yen, which is the sum of the prices of part A and part B. The total column of the row of "first replacement of part A". 104000 yen is stored as the cost Ct required for the countermeasure.

The row of cost of "first replacement of part B" stores a total cost of eliminating the error when the part B is replaced. In the cases CS1 to CS6, since it is necessary to further replace the part A after replacing the part B, the price of the part A and the part B of 11000 yen is stored in the row of "first replacement of part B". In the cases CS7 to CS10, the row of "first replacement of part B" stores 1000 yen, which is the price of part B. The total column of the row of "first replacement of part B". 70000 yen is stored as the required cost Ct.

In this case, the image processing system 500 preferably proposes to the service person that replacing the part B first costs less than replacing the part A first.

The work time can also be determined in a similar manner. The row of ideal of time stores time for ideal error elimination. Ideally, in the cases CS1 to CS6, since the error is eliminated by replacing only the part A. 30 minutes is stored in the row of ideal. In the cases CS7 to CS10, since the error is eliminated by replacing only the part B, five minutes is stored in the row of ideal. In this case, the total column stores 200 minutes, which is the sum of the replacement time of the part A of 30 minutes×six cases (cases CS1 to CS6) and the replacement time of the part B of five minutes×four cases (cases CS7 to CS10).

The row of time of "first replacement of part A" stores a total time of eliminating the error when the part A is replaced. In the cases CS1 to CS6, since the error is eliminated by replacing the part A, the row of "first replacement of part A" stores the replacement time of the part A of 30 minutes.

Here, in the cases CS7 to CS10, since the part B is the cause of the error, the error is not eliminated by replacing the part A. Therefore, in the cases CS7 to CS10, it is necessary to further replace the part B after replacing the part A. In the cases CS7 to CS10, the row of "first replacement of part A" stores 35 minutes, which is the sum of the replacement time of part A and part B. The total column of the row of "first replacement of part A" stores 320 minutes.

The row of time of "first replacement of part B" stores a total time of eliminating the error when the part B is replaced. In the cases CS1 to CS6, since it is necessary to further replace the part A after replacing the part B, the replacement time of the part A and the part B of 35 minutes is stored in the row of "first replacement of part B". In the cases CS7 to CS10, the row of "first replacement of part B" stores five minutes, which is the replacement time of part B. The total column of the row of "first replacement of part B" stores 230 minutes as the total time required.

In this case, the image processing system 500 preferably proposes to the service person that replacing the part B first takes less work time than replacing the part A first. The image processing system 500 gives a higher priority to the work of replacing the part B than the work of replacing the part A. and proposes the work of replacing the part B to the service person first.

Returning to FIG. 6B, the description will be continued. The specifier 21 of the server 200 specifies a countermeasure and a priority of the countermeasure on the basis of the predetermined proposal condition acquired by the proposal condition information acquirer 31, and selects a countermeasure having the highest priority (step S115).

Specifically, for example, when the proposal condition information acquirer 31 acquires the work time as the proposal condition, the specifier 21 specifies the priority of the countermeasure to replace the part B first as higher than the priority of the countermeasure to replace the part A first in terms of the work time. When acquiring the price of the part as the proposal condition, the specifier 21 specifies the priority of the countermeasure to replace the part B first as a higher priority than the priority of the countermeasure to replace the part A first.

The proposal condition information acquirer 31 may set, as the proposal condition, a time until an error of an image is corrected, an improvement level of the image error, an interval until recurrence, presence or absence of an additional measure for recurrence prevention, availability of emergency treatment by panel operation, an assumed mechanism, and availability of presentation of an error occurrence condition which are related to the customer satisfaction level. In this case, the proposal condition information acquirer 31 presents the plurality of different conditions to the service person for selection.

For example, the proposal condition information acquirer 31 may acquire, as the proposal condition. (1) a time until an error of an image is corrected. (2) an improvement level of the image error. (3) an interval until recurrence. (4) an additional measure for recurrence prevention. (5) emergency treatment by panel operation. (6) an assumed mechanism, and (7) an error occurrence condition.

In a case where the time until the error of the image is fixed is the proposal condition, the specifier 21 sets the priority of the countermeasure in which (1) the time until the error is corrected is shorter to be higher. Here, the specifier 21 predicts the work time of each countermeasure on the basis of an average value of time required for a service person to correct the same error that occurred in the past.

When (2) the improvement level of the image error is the proposal condition, the specifier 21 sets the priority of the countermeasure having a higher improvement level to be higher. Here, the specifier 21 predicts the improvement level by each countermeasure from examples of countermeasures in the past.

When (3) the interval until recurrence is the proposal condition, the specifier 21 sets the priority of a countermeasure having a longer interval until recurrence to be higher. The specifier 21 predicts the interval until recurrence from examples of countermeasures in the past.

In the same image forming apparatus 100, the specifier 21 determines that an error has occurred again when the same error as an error that occurred in the past occurs. That is, for example, when the feature of the case of a newly occurred error coincides with the feature of the case of the error occurred in the past by a predetermined ratio or more (for example 80% or more), the specifier 21 determines that the error has occurred again. As a result, the specifier 21 can specify an appropriate countermeasure by lowering the priority of a countermeasure related to the example of the error that occurred in the past.

Returning to FIG. 6B, the description will be continued. The outputter 24 proposes a countermeasure specified by the specifier 21 (step S117). Specifically, the outputter 24 transmits the countermeasure specified by the specifier 21 to the image forming apparatus 100 in which the error has occurred, and causes the display unit 121 of the image forming apparatus 100 to display the countermeasure.

The service person performs the work indicated by the countermeasure on the image forming apparatus 100 in which the error has occurred in the image (step S119). At that time, the recorder 18 automatically records the work content of the service person, the work time required for responding to the error, and the like (step S120). Note that the service person may manually input his/her work content, the work time required for responding to the error, and the like to the operation unit 122 of the image forming apparatus 100.

After responding to the error, the service person instructs the image forming apparatus 100 to print (step S121). In the image forming apparatus 100, the image former 14 prints an image on a recording medium, and the image reader 11 reads the image on the recording medium printed after responding to the error (step S123).

The inspector 13 of the image forming apparatus 100 inspects the error of the image on the recording medium printed after the service person responds to the error (step S125). In this case, the inspector 13 compares the read image read from the recording medium with the reference image, and extracts a difference between the read image and the reference image as a feature.

The control unit 10 transmits the feature extracted by the inspector 13 to the server 200 as an inspection result of the error via the communicator 17 (step S127). Note that the control unit 10 transmits, to the server 200, not only the features of the images before and after the response to the error (before and after the response), the features being extracted by the inspector 13, but also the features of the machine before and after the elimination of the error (before and after the response), and the work content and the work time of the service person. The control unit 10 further transmits the machine data and the environment data of the image forming apparatus 100 to the server 200.

The inspection result information acquirer 30 of the server 200 receives the features of the images before and after the response to the error (before and after the response), the features of the machine before and after the elimination of the error (before and after the response), the work content and the work time of the service person, and the machine data and the environment data of the image forming apparatus 100, by using the communicator 27, and accumulates the above in the accumulator 25 in association with each other (step S129).

In step S131, the determiner 23 of the server 200 determines whether the error has been eliminated by the response of the service person on the basis of the features of the images before and after the response to the error (before and after the response). When the error of the image is eliminated (Yes), the determiner 23 ends the processing of FIG. 6B. On the other hand, in step S131, when the error of the image is not eliminated (No), the determiner 23 proceeds to step S133.

Note that the determiner 23 determines whether the error has been eliminated in step S131, but the printed recording medium may be visually determined and manually input by the service person. Furthermore, it is desirable that a threshold for determining whether the error has been eliminated is appropriately variable in the determiner 23.

In step S133, the specifier 21 specifies a countermeasure with the next priority.

The outputter 24 outputs the next countermeasure specified by the specifier 21 and proposes the countermeasure to the service person (step S117). As described above, the image processing system 500 proposes a countermeasure with the highest priority against the error of the image of the image forming apparatus 100 to the service person, and if the error is not eliminated, sequentially proposes a countermeasure with the next priority.

As a result, the image processing system 500 can continuously propose countermeasures such as adjustment of the machine, cleaning of the machine, and replacement of parts even if the service person has implemented a countermeasure but the error of the image has not been eliminated.

As described above, the image processing system 500 according to the embodiment includes the image reader 11, the inspector 13, and the specifier 21. The image reader 11 reads an image formed on a recording medium. The inspector 13 inspects an error of the image read by the image reader 11. The specifier 21 specifies a countermeasure on the basis of information related to a result of the inspection by the inspector 13 and a predetermined proposal condition.

As a result, in the image processing system 500 according to the embodiment, since the specifier 21 specifies a countermeasure, the service person can take a suitable countermeasure against the error of the image.

Therefore, the image processing system 500 can reduce labor and work time of a service person and to suppress unnecessary replacement of parts for the error of the image.

In addition, in the image processing system 500, the plurality of image forming apparatuses 100a to 100n is connected to the server 200, and an example of an error occurring in each of the image forming apparatuses 100a to 100n can be shared. Therefore, the image processing system 500 can specify a countermeasure by the specifier 21 against an error having a low occurrence frequency and low reproducibility.

For example, CD fog unevenness corresponds to an example of an error having a low occurrence frequency and low reproducibility. CD fog unevenness is an error of an image in which, when fog has periodicity, fog is more noticeable than the entire fog. In this case, for example, even if the true cause is a contact failure of a connector, the error may appear to be temporarily corrected by replacing a member related to the error, such as a developing member or a base.

In this case, only the service person who has implemented a countermeasure against the error related to the true cause knows the correct countermeasure. Conversely, a wrong countermeasure may spread to other service persons. As described above, it is difficult for an appropriate countermeasure to be accumulated as know-how for an error having a low occurrence frequency and low reproducibility, and it often takes a considerable time to appropriately correct the error when the error occurs again.

The image processing system 500 according to the embodiment acquires and accumulates examples of errors from the plurality of image forming apparatuses 100a to 100n. As a result, it is possible to propose an appropriate countermeasure particularly against an error having a low occurrence frequency and low reproducibility.

<Modifications>

The present invention is not limited to the above embodiment, and can be modified without departing from the gist of the present invention into the following (a) to (k), for example.

(a) The image forming apparatus 100 may be without the accumulator 15 that accumulates, as an example, information related to the result of the inspection and a countermeasure corresponding to the information, and only the server 200 may include the accumulator 25.

(b) In the image processing system 500, at least one of the image reader 11, the inspector 13, the specifier 21, the accumulator 15, or the accumulator 25 may be communicably connected via the network 300. That is, the inspector 13 and the specifier 21 may be provided in any of the image forming apparatus 100 or the server 200, which is not limited.

(c) The accumulator 15 and the accumulator 25 may accumulate at least one of the machine data or the environment data of the image forming apparatus 100. In this case, the machine data is, for example, a parameter related to each member of the image forming apparatus 100. The environment data is, for example, a temperature or humidity inside a housing of the image forming apparatus 100 or a temperature or humidity outside the housing.

(d) The predetermined proposal condition when the specifier 21 specifies a countermeasure may be a condition based on at least one of the cause probability, the work time, the price of the replacement part, or the customer satisfaction level according to the result of the inspection.

(e) The image forming apparatus 100 may include the determiner 23 that determines whether the error of the image has been eliminated.

(f) The server 200 shown in FIG. 1 may function as an information processing apparatus including the accumulator 25 that accumulates information related to the result of an inspection of an error of an image and a countermeasure corresponding to the information as an example, the specifier 21 that specifies a countermeasure on the basis of the information and the predetermined proposal condition, and the outputter 24 that outputs the specified countermeasure. In addition, the server 200 may function as an information processing apparatus including the inspection result information acquirer 30, the proposal condition information acquirer 31, the specifier 21, and the outputter 24.

(g) The image processing system 500 may include the image former 14, the image reader 11, the inspector 13, the inspection result information acquirer 30, the proposal condition information acquirer 31, the specifier 21, and the outputter 24.

(h) The server 200 may include the learning data acquirer 29a, the learning device 29b, and the learning processor 29c, and may function as a learning apparatus that outputs specific countermeasure information when the inspection result information and the proposal condition information are input on the basis of the inspection result information, the proposal condition information, and the countermeasure information acquired by the learning data acquirer 29a.

(i) The embodiment is not limited to inspection of a recording medium printed by the image forming apparatus, and may be implemented as a countermeasure specifying system or a countermeasure specifying program that inspects an output material of a three-dimensional printer, specifies a countermeasure on the basis of a predetermined proposal condition, and outputs the countermeasure, and is not limited.

(j) The embodiment may be implemented as a countermeasure specifying system or a countermeasure specifying program that inspects any material, specifies a countermeasure on the basis of a predetermined proposal condition, and outputs the countermeasure, and is not limited.

(k) In the embodiment, the parameter of the learning device 29b learned by the server 200 may be distributed to each image forming apparatus 100, each image forming apparatus 100 may operate the learning device to specify the countermeasure on the basis of the information related to the result of the inspection by the inspector and the predetermined proposal condition.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing system comprising:
an image reader that reads an image formed on a recording medium;
an inspector that performs an inspection of an error of the image read by the image reader;
a specifier that specifies a countermeasure on a basis of information related to a result of the inspection by the inspector and a predetermined proposal condition; and
an accumulator that accumulates an example that includes the information related to the result of the inspection and the countermeasure corresponding to the information, wherein
a plurality of image forming apparatuses that forms an image on the recording medium is connected via a network, and
when an error occurs in the image forming apparatus connected via the network and an example of a same error of an image forming apparatus having a same configuration as the image forming apparatus has been accumulated in the accumulator, the specifier specifies the countermeasure on a basis of the example of the error of the image forming apparatus having the same configuration.

2. The image processing system according to claim 1, wherein the predetermined proposal condition is a condition based on at least one of a cause probability, a work time, a price of a replacement part, or a customer satisfaction level according to the result of the inspection.

3. The image processing system according to claim 2, further comprising a recorder that records a work content and the work time related to the countermeasure in a video or an audio.

4. The image processing system according to claim 1, wherein at least one of the image reader, the inspector, the specifier, or the accumulator is communicably connected via a network.

5. The image processing system according to claim 1, wherein when an error occurs in the image forming apparatus connected via the network and an example of a same error of an image forming apparatus having a different configuration from the image forming apparatus has been accumulated in the accumulator, the specifier specifies a countermeasure on a basis of the example of the same error regardless of the configuration of the image forming apparatus.

6. The image processing system according to claim 1, wherein the accumulator accumulates at least one of machine data or environment data of each of the plurality of image forming apparatuses.

7. The image processing system according to claim 6, wherein
the machine data includes a parameter related to each member of each of the image forming apparatuses,
the environment data includes a temperature or humidity inside a housing of each of the image forming apparatuses or a temperature or humidity outside the housing.

8. The image processing system according to claim 1, wherein when there is a plurality of candidates for the countermeasure, the specifier gives priority to the plurality of countermeasures on a basis of the predetermined proposal condition.

9. The image processing system according to claim 8, wherein when the priority is given to the plurality of countermeasures, the specifier executes a mode for isolating a cause of the error of the image.

10. The image processing system according to claim 1, further comprising a determiner that determines whether the error of the image has been eliminated.

11. The image processing system according to claim 10, wherein
when the determiner determines that the error of the image has been eliminated, the example is accumulated in the accumulator.

12. The image processing system according to claim 10, wherein a threshold for determining whether the error of the image has been eliminated is variable.

13. A non-transitory recording medium storing a computer readable countermeasure specifying program causing a computer to execute:
reading an image formed on a recording medium;
performing an inspection of an error of the image read;
specifying a countermeasure on a basis of information related to a result of the inspection and a predetermined proposal condition; and
accumulating an example that includes information related to the result of the inspection and the countermeasure corresponding to the information, wherein
a plurality of image forming apparatuses that forms an image on the recording medium is connected via a network, and
when an error occurs in the image forming apparatus connected via the network and an example of a same error of an image forming apparatus having a same configuration as the image forming apparatus has been accumulated, the specifying of the countermeasure specifies the countermeasure on a basis of the example of the error of the image forming apparatus having the same configuration.

14. An inspection method comprising:
reading, by an image reader, an image formed on a recording medium;
performing, by an inspector, an inspection of an error of the image read by the image reader;
specifying, by a specifier, a countermeasure on a basis of information related to a result of the inspection by the inspector and a predetermined proposal condition; and
accumulating, by an accumulator, an example that includes information related to the result of the inspection and the countermeasure corresponding to the information, wherein
a plurality of image forming apparatuses that forms an image on the recording medium is connected via a network, and
when an error occurs in the image forming apparatus connected via the network and an example of a same error of an image forming apparatus having a same configuration as the image forming apparatus has been accumulated in the accumulator, the specifying of the countermeasure specifies the countermeasure on a basis of the example of the error of the image forming apparatus having the same configuration.

15. An information processing apparatus comprising:
an accumulator that accumulates an example, that includes information related to a result of an inspection of an error of an image and a countermeasure corresponding to the information;
a specifier that specifies a countermeasure on a basis of the information and a predetermined proposal condition; and
an outputter that outputs the countermeasure specified, wherein
a plurality of image forming apparatuses that forms an image on the recording medium is connected via a network, and
when an error occurs in the image forming apparatus connected via the network and an example of a same error of an image forming apparatus having a same configuration as the image forming apparatus has been accumulated in the accumulator the specifier specifies the countermeasure on a basis of the example of the error of the image forming apparatus having the same configuration.

16. An information processing apparatus comprising:
an inspection result information acquirer that acquires inspection result information related to an inspection result of an output material;
a proposal condition information acquirer that acquires proposal condition information related to a predetermined proposal condition;
a specifier that specifies countermeasure information related to a countermeasure on a basis of the inspection result information acquired by the inspection result information acquirer and the proposal condition information acquired by the proposal condition information acquirer;
an outputter that outputs the countermeasure information specified by the specifier; and
an accumulator that accumulates an example that includes information related to the result of the inspection and the countermeasure corresponding to the information, wherein a plurality of image forming apparatuses that forms an image on the recording medium is connected via a network, and when an error occurs in the image forming apparatus connected via the network and an example of a same error of an image forming apparatus having a same configuration as the image forming apparatus has been accumulated in the accumulator, the specifier specifies the countermeasure on a basis of the example of the error of the image forming apparatus having the same configuration.

17. A countermeasure specifying system comprising:
an inspection result information acquirer that acquires inspection result information related to an inspection result;
a proposal condition information acquirer that acquires proposal condition information related to a predetermined proposal condition;
a specifier that specifies countermeasure information related to a countermeasure on a basis of the inspection result information acquired by the inspection result information acquirer and the proposal condition information acquired by the proposal condition information acquirer;
an outputter that outputs the countermeasure information specified by the specifier; and
an accumulator that accumulates an example that includes information related to the result of the inspection and the countermeasure corresponding to the information, wherein
a plurality of image forming apparatuses that forms an image on the recording medium is connected via a network, and
when an error occurs in the image forming apparatus connected via the network and an example of a same error of an image forming apparatus having a same configuration as the image forming apparatus has been accumulated in the accumulator, the specifier specifies the countermeasure on a basis of the example of the error of the image forming apparatus having the same configuration.

* * * * *